H. G. MOORE.
ROOF FOR VEHICLE BODIES.
APPLICATION FILED OCT. 22, 1918.

1,306,609.

Patented June 10, 1919.

Inventor
Harry G. Moore

Witnesses

By Victor J. Evans
Attorney

UNITED STATES PATENT OFFICE.

HARRY G. MOORE, OF PHILADELPHIA, PENNSYLVANIA.

ROOF FOR VEHICLE-BODIES.

1,306,609.  Specification of Letters Patent.  Patented June 10, 1919.

Application filed October 22, 1918. Serial No. 259,245.

*To all whom it may concern:*

Be it known that I, HARRY G. MOORE, a citizen of the United States, residing at Philadelphia, in the county of Philadelphia and State of Pennsylvania, have invented new and useful Improvements in Roofs for Vehicle-Bodies, of which the following is a specification.

The invention relates to vehicle bodies and more particularly to the roof structures thereof and has for an object to provide a roof which will be capable of great wear, and in which the usual waterproof covering will be prevented from being punctured by nails or other fastening elements.

Among other features the invention comprehends, a roof structure including a sub-frame formed of over-lying strips which are only secured to the body at their ends thereby insuring a moving contact between the engaging portions of the strips, the usual nails or other fastening elements being done away with so that there will be no danger of the over-lying covering becoming punctured. Further by having the sub-frame formed of over-lying strips in moving contact, the vibrations of force transmitted to the roof through the body will tend to lose themselves by reason of the unique structure of the sub-frame, whereas if the strips were relatively connected by nails, the latter would work out by reason of the vibrations or movement of the sub-frame.

It is well known that in roof constructions for vehicle bodies, particularly those of large automobile vehicles, such as trucks, the use of nails in the roof structure within the borders thereof, results in time, in the working loose of the nails to the extent that they are worked upwardly through the covering and thus puncture the same. With my invention I provide a series of strips which are arranged in layers with the strips in the upper layer over-lying the strips in the lower layer, but not relatively connected in a rigid manner at the usual intermediate portions, being only secured to the vehicle at the ends, thus allowing the strips of the upper layer to ride freely upon the strips of the lower layer so that the vibrations thus distributed, will tend to lose themselves and the absence of any nails or other fastening devices will prevent the puncturing of the over-lying cover or material generally employed in a roof structure.

Other objects and practical advantages of the invention will be fully understood from the following description and claims when the same are read in connection with the drawings, accompanying and forming part of this specification in which:

Similar numerals of reference designate corresponding parts in all of the views of drawings.

Figure 1:
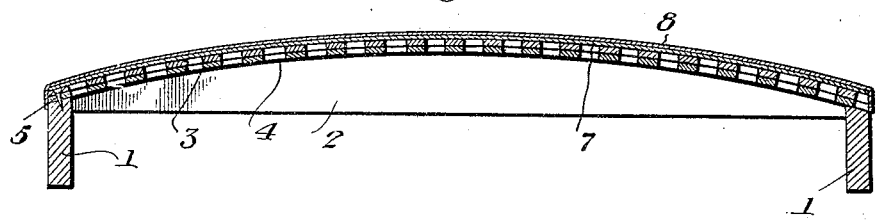
Figure 1 is a transverse section illustrating my novel roof for vehicle bodies.
Figure 2:
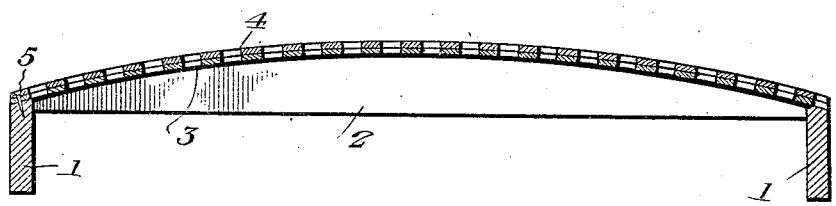
Fig. 2 is a similar view showing the reticulated or lattice work sub-frame as properly positioned on the ribs.
Figure 3:
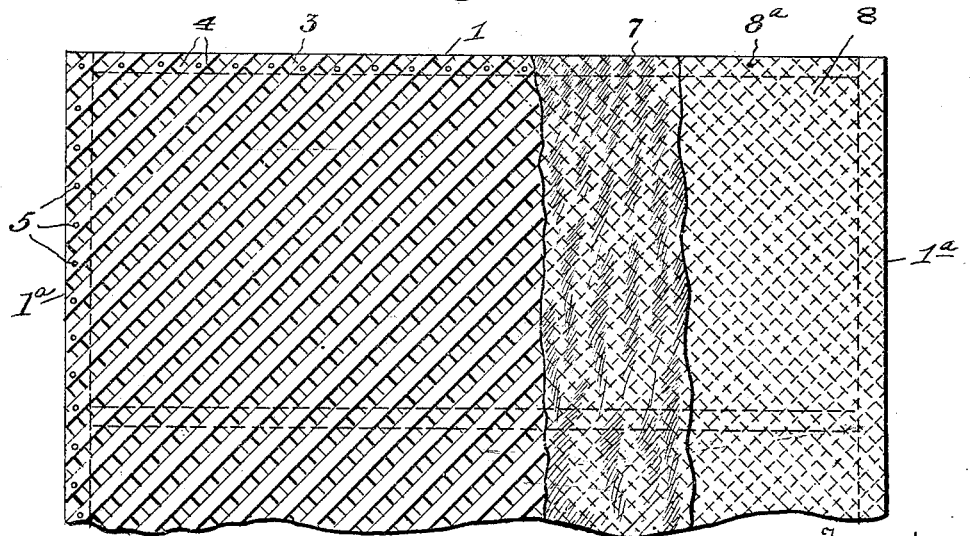
Fig. 3 is a detail view showing the reticulated or lattice work sub-frame in plan.

In furtherance of my invention I provide an open main frame having side bars or walls, and end bars or walls $1^a$, and upon the said side bars 1 I support spaced transverse ribs 2. These ribs 2 are rabbeted into the side bars or walls 1, and my invention contemplates the employment of not more than sufficient ribs to maintain the roof in shape.

Over the ribs 2 is arranged reticulated or lattice work 3, which is made up of reversely arranged strips 4, preferably, though not necessarily, diagonal, of wood or other suitable material. The said strips 4 are secured to the end frame bars or walls $1^a$, through the medium of nails or screws 5 or other suitable means.

It will be seen by reference to the drawings that the strips are in the nature of layers, with the strips extending in one direction constituting the lower layer and the strips extending in the other direction constituting the upper layer, the strips of the lower layer meeting the strips of the upper layer at their ends and at which points they are secured to the side frame or vehicle body by the nails or screws 5, although the intermediate contacting portions of the strips of the upper and lower layers are free for moving contact, as to each other.

Over the reticulated or lattice work sub-frame 3 is arranged an imperforate covering. The said covering in the preferred embodiment of my invention, is made up of a lower layer 7 of soft and absorbent material, such as felt or shoddy, and an upper layer 8 of some suitable water proof material; the said layers being suitably connected to the ribs 3 and the frame bars 1 as well as to the sub-frame strips 4 by brads 8ª or other suitable means.

It will be appreciated from the foregoing that I have provided for vehicle bodies a roof which while simple and inexpensive in construction and light in weight is designed to allow for all tortional and other strains born of the travel of the vehicle over rough roads, and to take advantage of the large area provided for the distribution of the vibrations as they travel from the points of their creation, with the result that any strain imposed on my novel roof will, by the reticulated or open work sub-frame 3 thereof, be distributed throughout a wide area of the roof.

Having described my invention, what I claim and desire to secure by Letters Patent is:

1. A vehicle-body top having a supporting frame and also having sets of strips connected at their ends with said frame; the intermediate portions of one set of strips overlying the strips of the other set and disposed at angles thereto, with the opposed intermediate portions of the strips disconnected and free to play each relative to the other.

2. In a vehicle-body top, the combination of a supporting frame; sets of strips connected at their ends with said frame, the intermediate portions of one set of strips overlying the strips of the other set and disposed at angles thereto, with the opposed intermediate portions of the strips disconnected and free to play each relative to the other; and an imperforate covering arranged over said sets of strips and connected with said supporting frame.

3. A vehicle-body top including sets of strips disposed at angles to each other with some of the strips overlying others and free therefrom to play independently relative to each other under the stress of vibration.

4. A vehicle-body top including sets of strips disposed at angles to each other with some of the strips overlying others and free therefrom to play independently relative to each other under the stress of vibration, in combination with an imperforate covering superimposed upon the sets of strips.

5. A vehicle-body top having a supporting frame and also having sets of strips connected at their ends with said frame and arranged diagonally with reference to the vehicle-body and one set at angles to the other; the intermediate portions of one set of strips overlying the strips of the other set, with the opposed intermediate portions of the strips disconnected and free to play each relative to the other.

6. A vehicle-body top having a supporting frame and also having sets of strips connected at their ends with said frame and arranged diagonally with reference to the vehicle-body and one set at angles to the other; the intermediate portions of one set of strips overlying the strips of the other set, with the opposed intermediate portions of the strips disconnected and free to play each relative to the other, in combination with an imperforate covering superimposed upon said sets of strips.

7. A vehicle-body top including sets of strips arranged diagonally with reference to the body and disposed at angles to each other with some of the strips overlying others and free therefrom to play relative to each other.

8. A vehicle-body top including sets of strips arranged diagonally with reference to the body and disposed at angles to each other with some of the strips overlying others and free therefrom to play relative to each other, in combination with an imperforate covering superimposed upon the sets of strips.

9. In a vehicle-body top, the combination of a supporting frame, sets of strips arranged diagonally with reference to the body and disposed at angles to each other upon said frame with some of the strips overlying others and free therefrom to play relative to each other, said strips connected at their ends with said frame, and an imperforate covering connected with said frame and superimposed upon said sets of strips.

In testimony whereof I affix my signature.

HARRY G. MOORE.